(12) United States Patent
Nakano (10) Patent No.: US 6,724,108 B2
(45) Date of Patent: Apr. 20, 2004

(54) AUTOMOTIVE AC GENERATOR WITH RECTIFIER

(75) Inventor: Kazutoshi Nakano, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/345,320

(22) Filed: Jan. 16, 2003

(65) Prior Publication Data

US 2003/0137201 A1 Jul. 24, 2003

(30) Foreign Application Priority Data

Jan. 18, 2002 (JP) ....................................... 2002-009882

(51) Int. Cl.⁷ ................................................ H02K 1/32
(52) U.S. Cl. .......................... 310/68 D; 310/64; 310/89
(58) Field of Search .............................. 310/68 D, 64, 310/89, 52, 58, 59

(56) References Cited

U.S. PATENT DOCUMENTS

| | | | | |
|---|---|---|---|---|
| 3,610,975 A | * | 10/1971 | Onjanow ..................... | 310/57 |
| 4,492,885 A | * | 1/1985 | Kitamura et al. ............ | 310/62 |
| 5,233,255 A | * | 8/1993 | Kusumoto et al. .......... | 310/263 |
| 5,949,166 A | | 9/1999 | Ooiwa et al. .............. | 310/68 B |

FOREIGN PATENT DOCUMENTS

JP A 11-164538 6/1999

* cited by examiner

*Primary Examiner*—Dang Le
(74) *Attorney, Agent, or Firm*—Oliff & Berridge, PLC (57) ABSTRACT

A vehicle AC generator include a frame, stator, rotor, rectifier, protective cover, and cooling fan. The rectifier includes plural rectifying elements consisting of positive and negative rectifying elements and is secured on an outer end portion of the frame. The rectifier includes larger-diameter and smaller-diameter fins. The negative rectifying elements are mounted on the larger-diameter fin. The positive rectifying elements are mounted on the smaller-diameter fin. The protective cover includes an axial opening facing the smaller-diameter fin. The frame includes a radial opening formed with the aid of a radially outer end of the frame, a radial air passage formed with facing the larger-diameter fin, and plural grooves. Each groove positionally corresponds to a mounted position of each rectifying element on the larger-diameter fin and is formed on the radial air passage to connect a radially outer end and a radially inner end of the frame.

6 Claims, 11 Drawing Sheets

FIG. 12
PRIOR ART

AUTOMOTIVE AC GENERATOR WITH RECTIFIER

BACKGROUND OF THE INVENTION

1. Technical Field of the Invention

The present invention relates to an AC (alternating current) generator, and in particular, to an automotive AC generator with a rectifier capable of rectifying generated AC power into DC (direct current) power.

2. Description of Related Art

In a recent automotive vehicle, an effective capacity inside the passenger compartment has been desired to be larger. In realizing such an object, one countermeasure is to reduce the space of the engine room. It is also required that an automotive AC generator be downsized.

Under such circumstances, a significant subject to be resolved is that the cooling performance of a rectifier mounted to the automotive AC generator is maintained or improved. This subject is not an easy matter, because saving the space in the engine room will lead to deteriorated temperature environment therein and downsizing the automotive AC generator itself will lead to deterioration in the cooling efficiency thereof.

Figure 10:
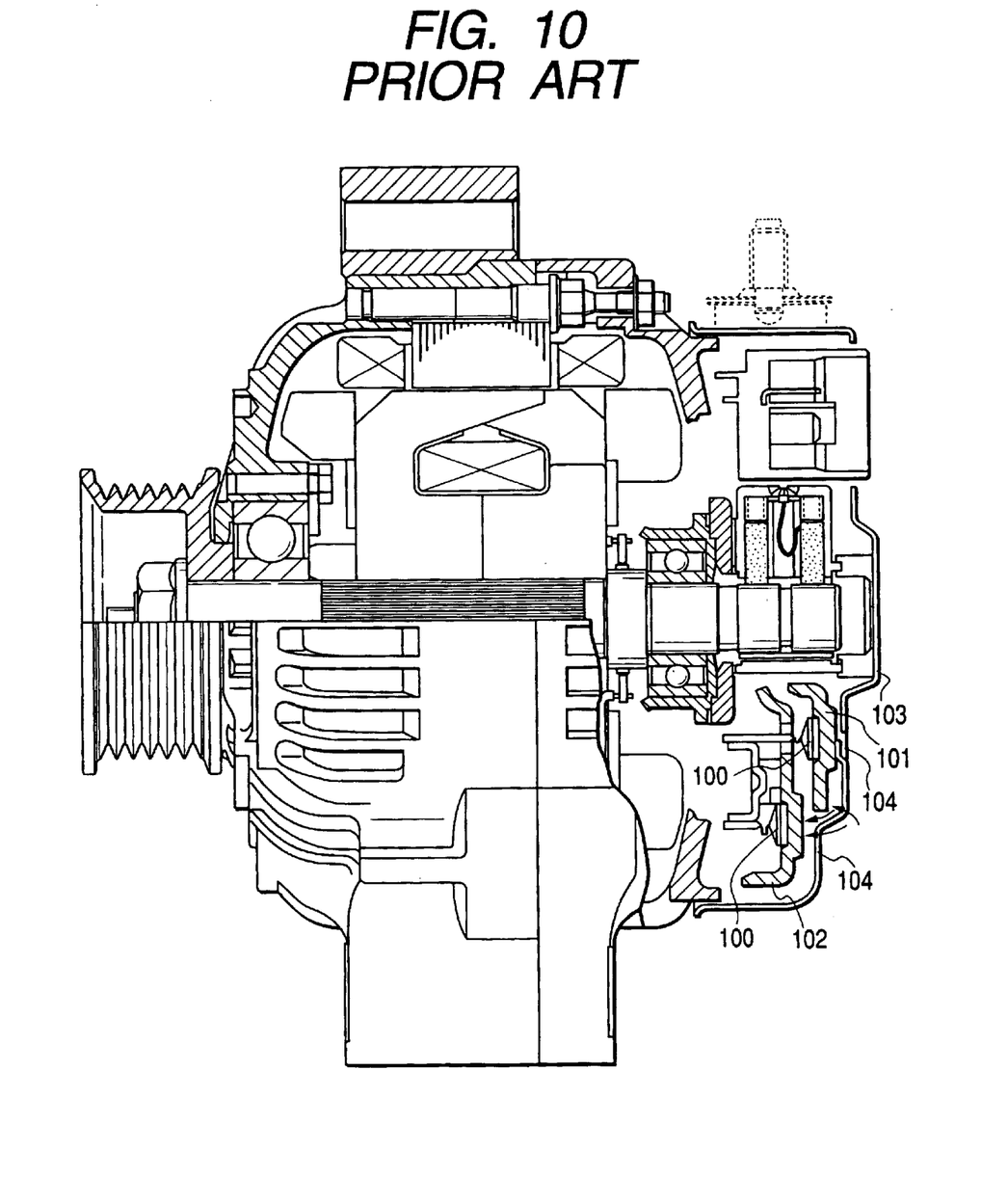
FIG. 10 is a partial sectional view, sectioned in an axial direction, of an automotive AC generator according to a first conventional example.

FIG. 10 shows an automotive AC generator according to a first conventional example. This generator adopts a configuration for improving the cooling efficiency, in which both of positive and negative fins 101 and 102 on which rectifying elements 100 are mounted are arranged, in an overlaid fashion, in parallel to each other in an axial direction thereof. A protective cover 103 has two cooling air inlets 104 opened at predetermined portions near the rectifying elements 100. Cooling air is thus directly introduced to the rectifying elements 100 (precisely, to the back surfaces of the fins 101 and 102) are cooled down by the introduced cooling air.

However, the above first conventional example has an inconvenience, which is concerned with the circulation of the cooling air. To be specific, the cooling air that has been introduced is directly blown onto a predetermined region on each of the backs of the cooling fins 101 and 102, such a region almost corresponding to each of the positions of the rectifying elements 100 or thereabout. But the cooling air is reluctant to circulating around each of the cooling fins 101 and 102 toward the surface on which element connection terminals are located thereon, respectively. In addition, one rectifying element located outward in the radial direction is placed in the downstream flow of the cooling air that passes by the other rectifying elements. Thus, it is obliged that the rectifying elements located radially outward are cooled down by the cooling air of which temperature has already been raised considerably. Therefore, the above cooling configuration has faced the problem that the cooling efficiency was not sufficient.

Figure 11:
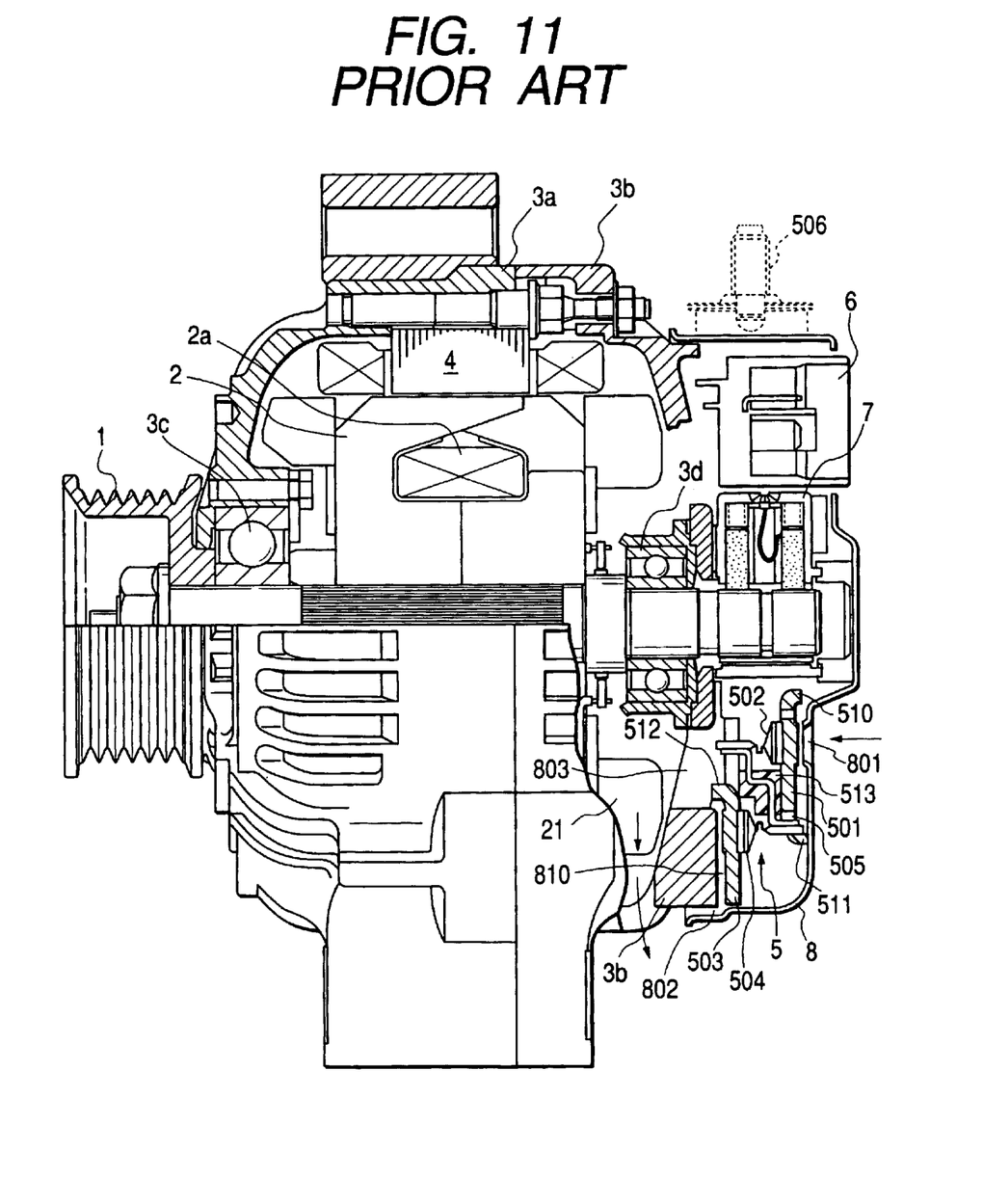
FIG. 11 is a partial sectional view, sectioned in an axial direction, of an automotive AC generator according to a second conventional example.
Figure 12:
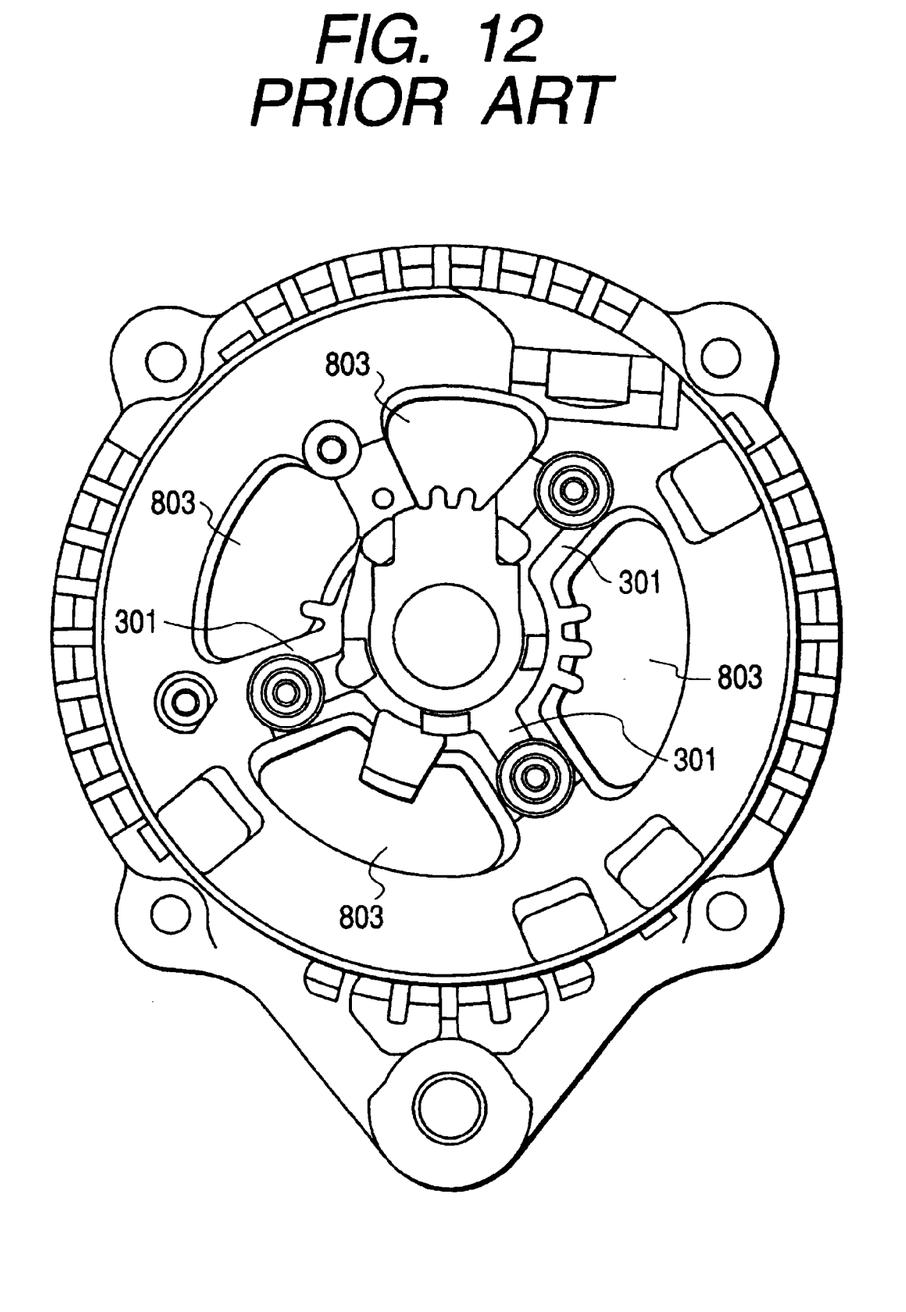
FIG. 12 is a frontal view showing the automotive AC generator shown in FIG. 11, with its protective cover and rectifier both disassembled.

In consideration of the above inconvenience, the present applicant has already provided a second conventional example according to Japanese Patent Laid-open publication No. 11(1999)-164538, which is typically shown in FIGS. 11 and 12. This example concerns an automotive AC generator that has a larger-diameter fin 503 located near to a rear frame 3b and a smaller-diameter fin 501 located near to a protective cover 8. Rectifying elements 502 and 504 are arranged on the fins 501 and 503, respectively, in the axial direction of the generator. The rectifying elements 502 and 504 come face to face with each other with a predetermined gap left therebetween, but both the fins 501 and 503 are mutually shifted outward or inward in the radial direction. The protective cover 8 has axial openings 801, each of which permits air to pass therethrough directly to each positive rectifying element 502. Additionally, there is formed a radial air passage 801 between the larger-diameter fin 503 and the rear frame 3b in such a manner that the air passage 801 passes by the central position of each of the negative rectifying elements 504. A radial opening 802 that allows air to be directly introduced to one end of the radial air passage 810 that is located outward in the radial direction. This cooling configuration causes the cooling air to circulate the gap between both the element-mounting surfaces of the fins 501 and 503. Hence the cooling air that has been taken in passes along the surfaces of the cooling fins 501 and 503 on which the rectifying elements 502 and 504 are disposed, respectively.

In the above automotive AC generator according to the second conventional example, however, there is still a problem that the larger-diameter fin 503 may suffer from a shortage of the cooling capacity, although the radial air passage 810 allows the cooling air to pass along the frontal and rear surfaces of the larger-diameter fin 503. Practically, if the amount of flow of air from a cooling fan 21 is reduced on account of, for example, making the entire size of the automotive AC generator compact, the amount of flow of cooling air that passes the radial air passage 810 formed between the rear frame 3b and the larger-diameter fin 503 is also reduced. In such an occasion, the cooling performance for the larger-diameter fin 503 will decrease, with the result that the rectifying elements 504 secured on the larger-diameter fin 503 are subjected to a rise in its temperature.

SUMMARY OF THE INVENTION

The present invention has been performed in consideration of the above-described drawback, and an object of the present invention is to provide an automotive AC generator with a rectifier including a larger-diameter fin, which is able to provide the larger-diameter fin with cooling air in a more effective way so that the cooling performance of the larger-diameter fin is increased dramatically.

In order to achieve the above object, the present invention provides a vehicle AC generator comprising: a frame, having a radial direction and an axial direction, formed to have an inner wall area, a radially inner end, and a radially outer end in the radial direction and an outer end portion in the axial direction; a stator secured on the inner wall area of the frame; a rotor rotatably supported at the frame; a rectifier including a plurality of rectifying elements and being secured on the outer end portion of the frame, said plurality of rectifying elements being classified into a first group of rectifying elements and a second group of rectifying elements; a protective cover having an inner end portion and being secured on the outer end portion of the frame to cover the rectifier; and a cooling fan secured at the rotor and configured to take in cooling air from one side on which the rectifier is located. The rectifier comprises a larger-diameter fin disposed to extend in the radial direction with facing the outer end portion of the frame, said larger-diameter fin serving as both of a cooling member for the first group of rectifying elements and a connecting conductive member of the first group of rectifying elements mounted on the larger-diameter fin; and a smaller-diameter fin disposed to face the inner end portion of the protective cover, said smaller-diameter fin serving as both of another cooling member for the second group of rectifying elements and another connecting conductive member of the second group of rectifying elements mounted on the larger-diameter fin. The protective cover comprises an axial opening facing the smaller-diameter fin and being formed through the frame to take cooling air in. The frame comprises a radial opening formed with the aid of the radially outer end of the frame to take cooling air in, a radial air passage formed with facing the larger-diameter fin and formed to circulate the cooling air taken in through the radial opening along the larger-diameter fin inwardly in the radial direction, and a plurality of grooves each positionally corresponding to a mounted position of each rectifying element on the larger-diameter fin and being formed on the radial air passage to connect the radially outer end and the radially inner end of the frame.

Accordingly, the cooling air taken in through the radial opening is able to cool down the larger-diameter fin. That is, the cooling air that has taken in from the outside circulates through the radial air passage toward radially inward with the air along the larger-diameter fin. The larger-diameter fin can therefore be cooled down effectively by the cooling air whose temperature is lower, which gives a preferable cooling operation to the rectifying elements mounted on the larger-diameter fin.

In addition, the frame has the radial air passage on which the grooves are formed radially therethrough correspondingly to each of the mounted positions of the rectifying elements on the larger-diameter. Hence a large amount of cooling air is able to circulate along each groove, thereby cooling down the mounted positions of the larger-diameter fin in a surer and steadier manner.

On the other hand, the smaller-diameter fin is preferably cooled down by lower-temperature cooling air taken in through the axial opening from the outside. In response to such cooling, the rectifying elements mounted on the smaller-diameter fin are also cooled down effectively.

The existence of the grooves on the radial air passage leads to only partial enlargement in the section of the radial air passage itself. In other words, an amount of cooling air that circulates through the entire radial air passage is avoided from increasing to a larger extent. Hence an amount of cooling air to be taken in through the axial opening is also less, almost completely eliminating the worry that the cooling performance for both of the smaller-diameter fin and the rectifying elements mounted thereon may reduce.

In the foregoing fundamental configuration, it is preferred that each groove has a width set to an amount equal to or larger than about 0.5 times a width of each rectifying element mounted on the larger-diameter fin.

This limitation of the dimensions is also effective in obtaining a steadier cooling performance on the larger-diameter fin and the rectifying elements mounted thereon. This is because such limited dimensions makes it possible to give a sufficient amount of air to the cooling air that passes along the back of each of the mounted positions of the rectifying elements on the front of the larger-diameter fin.

It is still preferred that each groove has a width set to an amount equal to or smaller than about 1.5 times a width of each rectifying element mounted on the larger-diameter fin.

This limitation of the dimensions is also effective in obtaining a steadier cooling performance on the smaller-diameter fin and the rectifying elements mounted thereon. This is because such limited dimensions makes it possible to avoid an flow of cooling air passing through the radial air passage from increasing to a lager extent, thereby having less influence on an amount of cooling air taken in through the axial opening. As a result of it, an amount of cooling air for the smaller-diameter fin and the rectifying elements mounted thereon will not be reduced so much, gaining a preferable cooling performance.

Also preferably, each groove on the radial air passage has a height in the axial direction, said height being set to an amount equal to or larger than about 0.5 times of a thickness of the larger-diameter fin.

This setting of dimensions is able to provide a sufficient amount of air to cooling air circulating along a predetermined portion in the radial air passage, the predetermined portion being by the rear of the larger-diameter fin and being opposed to positions of the rectifying elements mounted on the front of the larger-diameter fin. Thus it is possible to steadily cool down the larger-diameter fin and the rectifying elements mounted thereon.

DETAILED DESCRIPTION OF PREFERRED EMBODIMENTS

Referring to FIGS. 1 to 8, one embodiment of an automotive AC generator according to the present invention will now be described. In the following, the constituents similar or identical to those in FIGS. 11 and 12 will be referenced using the same reference numbers.

Figure 1:
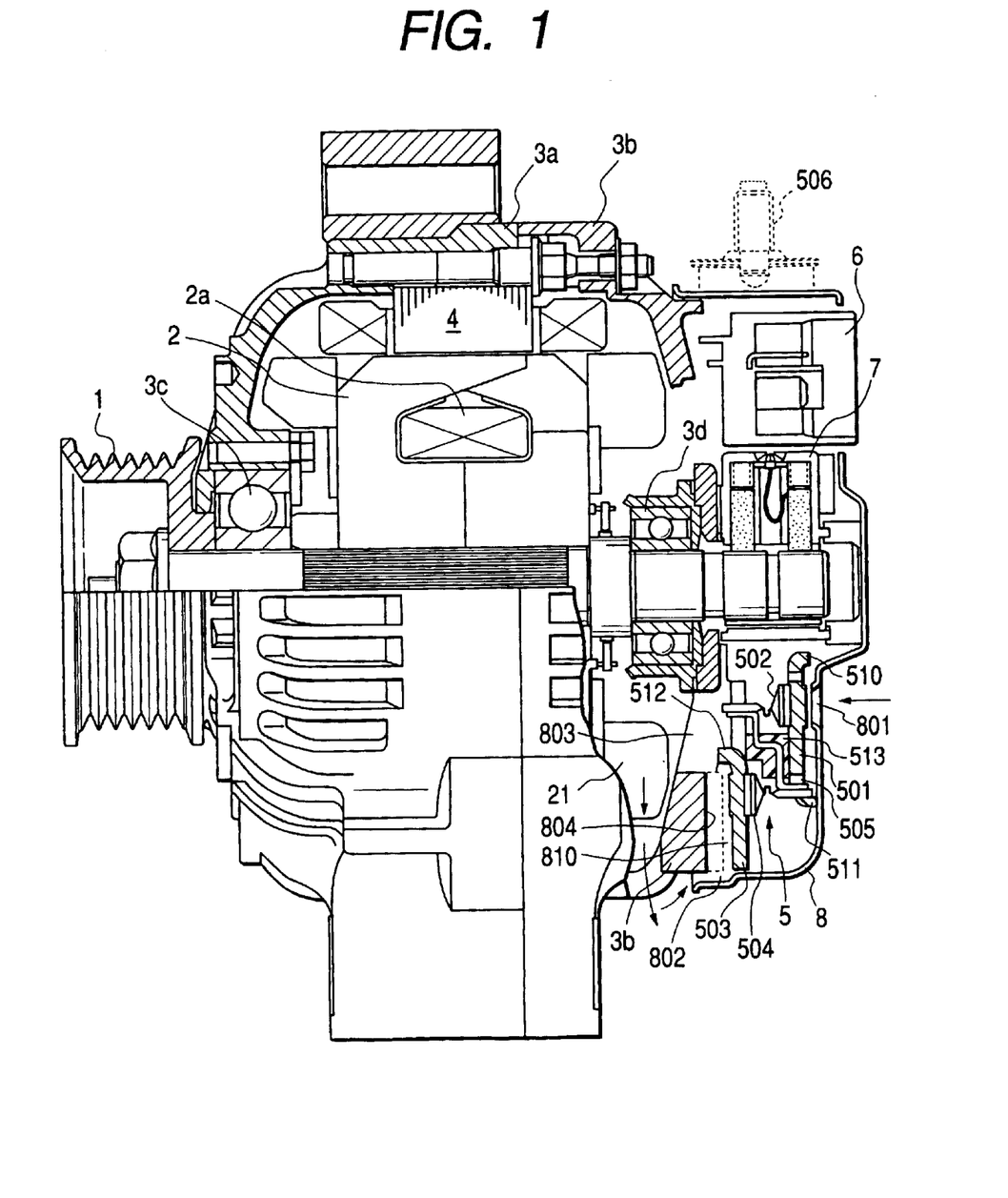
FIG. 1 is a partial sectional view, sectioned in an axial direction, of an automotive AC generator according to one embodiment of the present invention.
Figure 2:
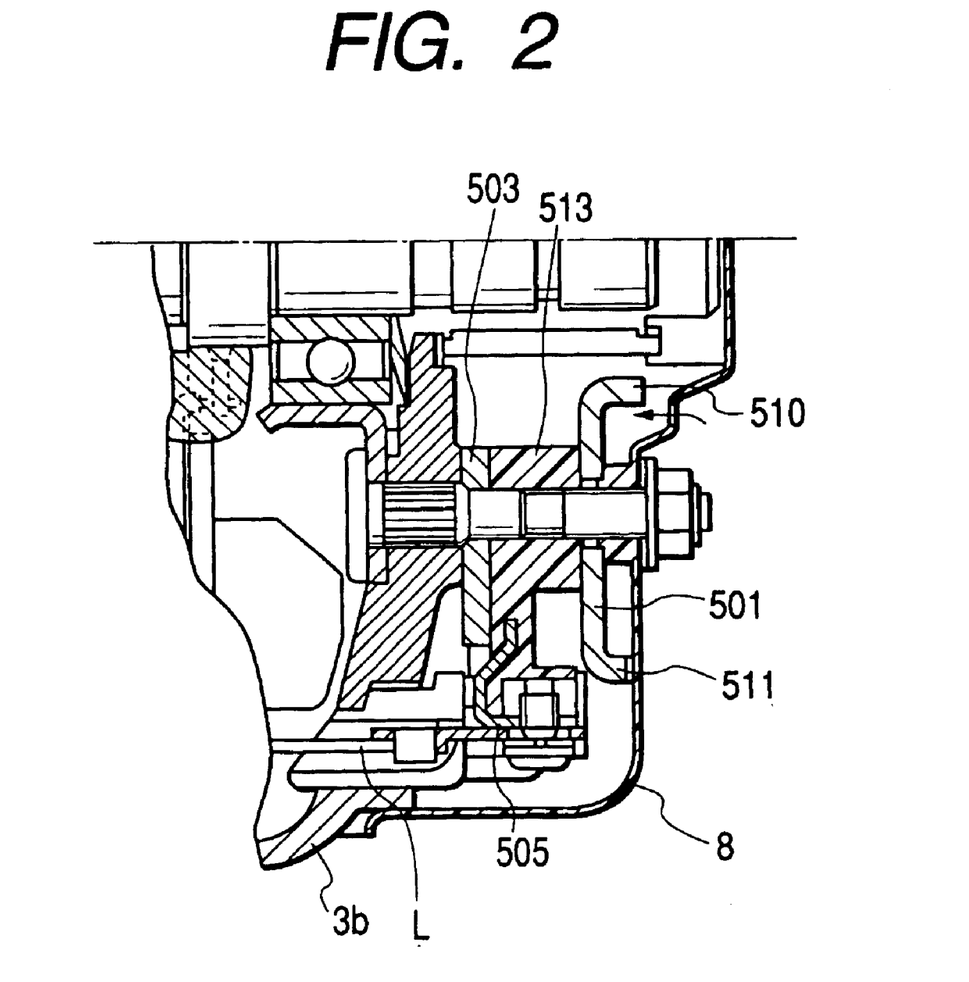
FIG. 2 is an enlarged view showing a rectifier part of the automotive AC generator shown in FIG. 1.

FIG. 1 shows an automotive AC generator, which can also be called "alternator." As shown therein, this automotive AC generator is provided with a rotor (rotating member) 2, bearings 3c and 3d, a stator (fixed member) 4, a rectifier 5, a regulator 6, a brush 7, and a protective cover 8.

Of these constituents, the rotor 2 rotates responsively to a rotation force transmitted from an automotive engine (not shown) via a belt (not shown) with the help of a pulley 1. The bearings 3c and 3d are provided to rotatably support the rotor 2 within a frame body consisting of frames 3a and 3b. The stator 4, which is secured on the inner wall of both the frames 3a and 3b around the rotor 2, responds to a rotating magnetic field generated by the rotation of the rotor 2, whereby AC (alternating current) voltage is induced. The rectifier 5 is provided to convert the AC power generated by the stator 4 into DC (direct current) power. The regulator 6 is responsible for regulating the DC output voltage rectified by the rectifier 5 into a desired voltage amount. Further, the brush 7 is used to supply excitation current to field winding 2a for the rotor 2. Moreover, the protective cover 8, which is made of for example metal, is detachably mounted to one axial end of the rear frame 3b such that the cover contains the foregoing stator 4, rectifier 5, regulator 6 and brush 7.

The rectifier 5 is thus fixedly located between the rear frame 3b and the protective cover 8 and securely fastened to supporters 301 (refer to FIG. 4) for a bearing box, together with the protective cover 8. The rectifier 5 is equipped with smaller-diameter and larger-diameter fins 501 and 503 and positive and negative rectifying elements 502 and 504, of which number is four, respectively.

Soldering enables the positive rectifying elements 502 to be mounted to the smaller-diameter fin 501 of positive potential, with the connection terminal of each element 502 being directed toward the larger diameter fin 503. Like the above, soldering enables the negative rectifying elements 504 to be mounted to the larger-diameter fin 503 of negative potential, with the connection terminal of each element 504 being directed toward the smaller diameter fin 501. These connection terminals are linked with stator leads L by way of stator lead connection terminals 505, respectively. These connections produce an AC bridge circuit, whereby this circuit supplies DC output from a B-bolt 506 (refer to FIGS. 1 and 3) mounted to the smaller-diameter fin 501 of positive potential.

Each positive rectifying element 502 is a diode provided at a higher-voltage side of a full-wave rectifying circuit, while each negative rectifying element 504 is a diode provided at a lower-voltage side of the full-wave rectifying circuit. Compared to the combination of the larger-diameter fin 503 and the negative rectifying elements 503, the combination of the smaller-diameter fin 501 and the positive rectifying elements 502 is located nearer to the center in a radial direction of the generator and nearer to the protective cover 8 in an axial direction of the generator. Hence, compared to the combination of the smaller-diameter fin 501 and the positive rectifying elements 502, the combination of the larger-diameter fin 503 and the negative rectifying elements 503 is located far from the radial center and near to the frame 3b in the axial direction.

Further, an axial opening 801 is formed through the protective cover 8 at its given position facing each positive rectifying element 502. Moreover, as shown in FIG. 1, between a radially outer circumferential end of the frame 3b and the protective cover 8, a radial opening 802 is formed to take air in therethrough. A radial air passage 810 is formed between the larger-diameter fin 503 and the frame 3b. Thus, air that has been taken in through the radial opening 802 is allowed to circulate along each radial air passage 810.

Cooling air that has been taken in through the axial openings 801 is directly blown onto each given area of the rear surface of the smaller-diameter fin 501, the given area facing, via the wall of the fin 501 itself, an area at which each positive rectifying element 502 is mounted. Thus, the smaller-diameter fin 501, that is, the positive rectifying elements 502 is cooled down. On the other hand, cooling air that has been taken in through the radial opening 802 is made to flow along a region of the rear surface of the larger-diameter fin 503, the region facing, via the wall of the fin 503 itself, an area at which each negative rectifying element 504 is mounted. In consequence, the larger-diameter fin 503, i.e., the negative rectifying elements 504 is cooled down. These cooling configurations allow flows of cooling air that have been taken in separately to cool the positive and negative rectifying elements 502 and 504 in a direct manner, respectively.

Clearances are formed between the protective cover 8 and the smaller-diameter fin 501, between the smaller-diameter fin 501 and the larger-diameter fin 503, and between the larger-diameter fin 503 and the frame 3b, so that cooling air is able to pass through the clearances, respectively. A width of each clearance in the axial direction is set to an amount of 10 mm or less that is able to accelerate the flow of the taken-in cooling air. This acceleration of the flows of cooling air allows both the smaller- and larger-diameter fins 501 and 503 to be cooled down in an efficiency fashion. Because the smaller-diameter fin 501 is formed into an almost ring-like shape, its heat conduction is made excellent and its heat distribution is made uniform. Hence the entire fin 501 can effectively be used as cooling means, thus giving a larger surface area to the smaller-diameter fin 501, thus providing a greater cooling performance.

Furthermore, as shown in FIGS. 1, 3, 4 and 5, four grooves 804 are formed, as part of the radial air passage 810, on the frame 3b so that each groove 804 is opened to the radial air passage 810 and faces a predetermined area on the rear surface of the larger-diameter fin 503. The predetermined area positionally corresponds to the mounted portion of each negative rectifying element 504 on the frontal surface of the larger-diameter fin 503. Each groove 804, formed into an almost rectangular shape in its cross section perpendicular to its longitudinal direction and extends radially, mutually connects the radially outer end (that is, the outer circumferential surface) of the frame 3b and the radially inner end of the frame 3b to which each cooling air inlet 803 is opened.

Forming such grooves 804 radially through the frame 3b makes it possible that each radial air passage 810 can be partially extended in its cross section perpendicular to the radial direction. That is, only predetermined portions of the radial air passage 810, each of which positionally corresponds to the mounted portion of each negative rectifying element 504, can be extended in its cross section. An amount of cooling air that passes such portions is thus increased, whereby both of the mounted portion of each negative rectifying element 504 on the frontal surface of the larger-diameter fin 503 and each negative rectifying element 504 can be cooled down in a more effective manner.

Because the radial air passage 810 is partially extended in its section perpendicular to the axial direction, without being extended over the entire section thereof, there is less influence of an amount of air on the cooling air taken in through the axial openings 801. This situation is very advantageous as follows. The air-intake capability of the cooling fan 21 is constant. Accordingly, if the radial air passage 810 were extended entirely in its section, an amount of cooling air that passes therethrough would be increased largely. If such a case happens, an amount of cooling air that passes the radial openings 801 should be decreased responsively. However, this embodiment adopts the radial air passage 810 that is not extended entirely in its cross section, which is able to avoid the above drawback. Therefore, the cooling performance of both the smaller-diameter fin 501 and the negative rectifying elements 502 mounted on the fin 502 can be prevented from deteriorating.

Figure 7:
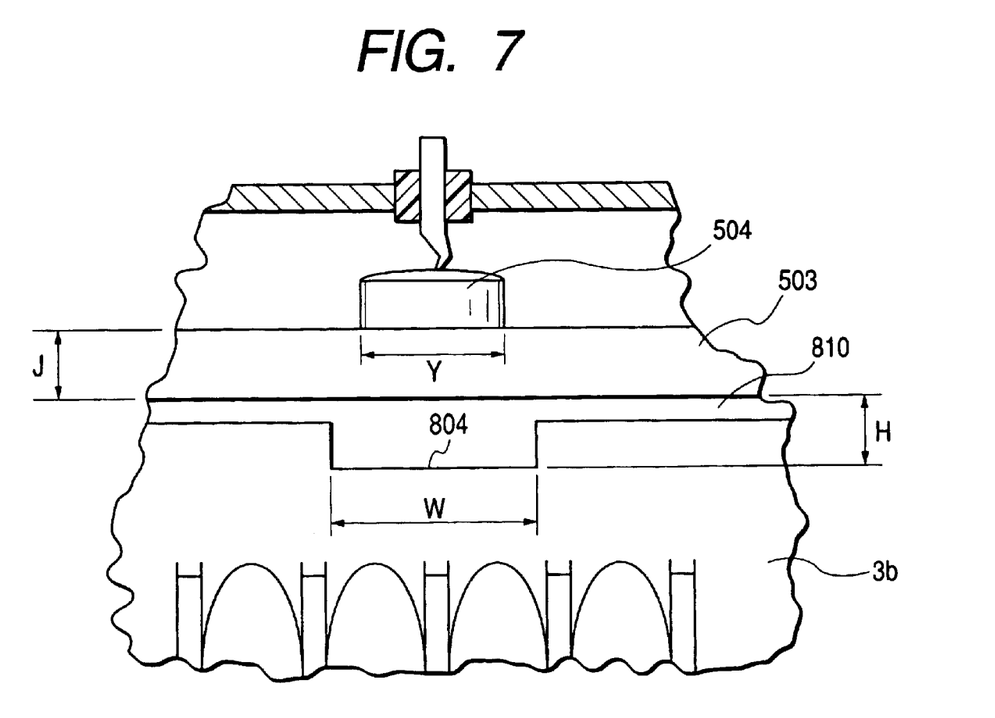
FIG. 7 is a partial side view showing both of a larger-diameter fin and a rear frame secured to the automotive AC generator.

FIG. 7 is a side view illustrating part of the rear frame 3b, which accompanies part of the larger-diameter fin 503 and one groove 804 facing each negative rectifying element 504 mounted on the opposite surface of the larger-diameter fin 503. In this embodiment, provided that the size of a clearance between the larger-diameter fin 503 and the bottom of each groove 804 formed as part of the radial air passage 810 on the frame 3b (hereafter, referred to as an "axial height" of the radial air passage 810) is expressed by H, the width of each groove 804 is expressed by W, the outer dimension of each negative rectifying element 504 is expressed by Y, and the thickness of the larger-diameter fin 503 is expressed by J, the relationships of $$H=J$$

and $$W \approx 1.2\ Y$$

are established.

Figure 8:
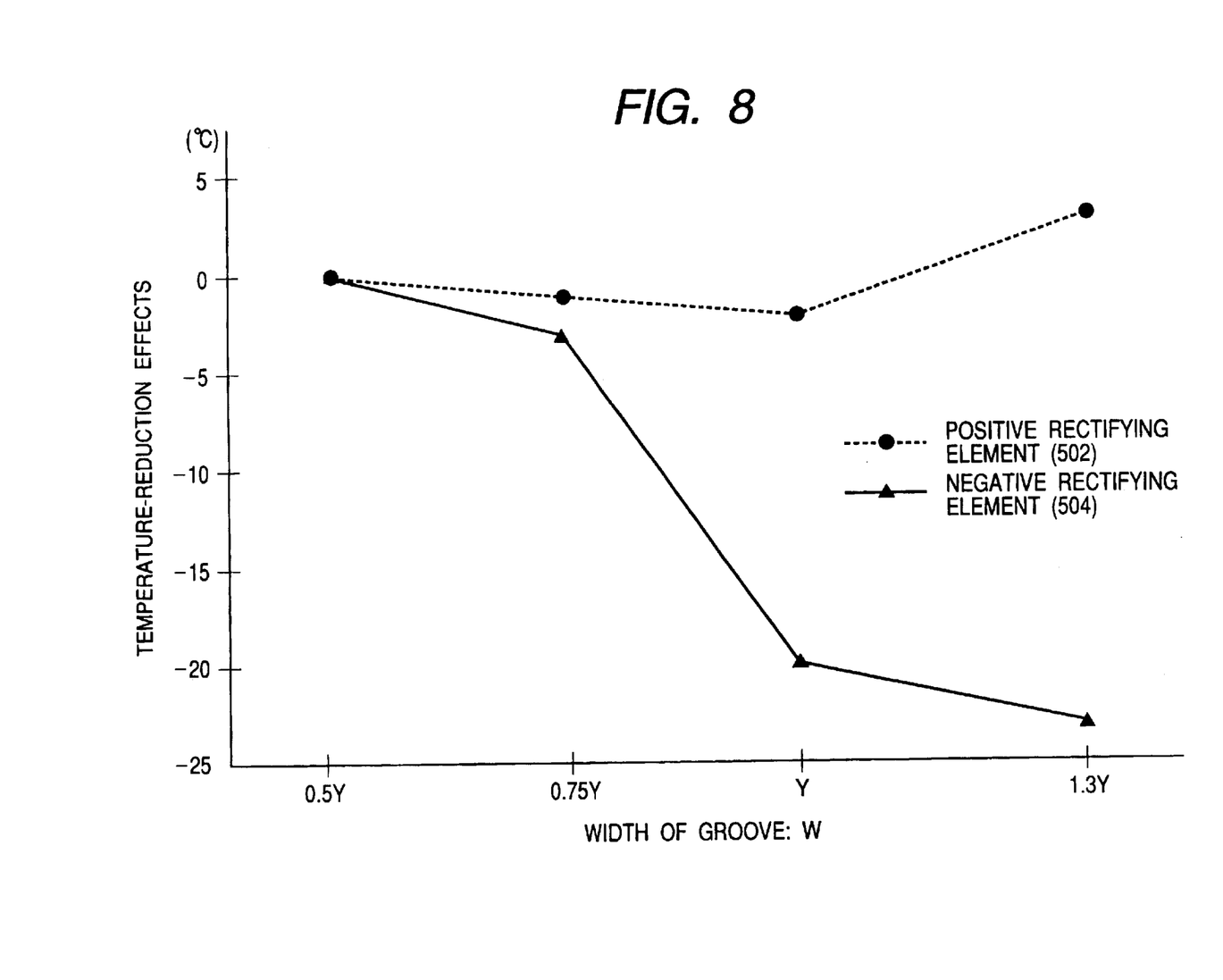
FIG. 8 is a graph indicative of the advantage of lowering temperature achieved in positive and negative rectifying elements adopted by the automotive AC generator.

On condition that the axial height H of the radial air passage 810 is constant (i.e., H=J=4 mm) and the width W of each groove 804 is changed to various amounts, changes in temperature at each positive rectifying element 502 and each negative rectifying element 504 were examined through experiments. The examined results are shown in FIG. 8, which shows temperature-reduction effects at the elements 502 and 504. In FIG. 8 and in following explanation, the unit of temperature is centigrade. The graphs shown in FIG. 8 are depicted compared to a conventional automotive AC generator with no grooves corresponding to the foregoing grooves 804. Thus, it can be understood from the graphs that there is an improvement in the temperature-reduction effects when amounts in the ordinate become negative, there is no change in the temperature-reduction effects when an amount in the ordinate becomes zero, and there is a deterioration in the temperature-reduction effects when amounts in the ordinate become positive.

Under a condition of W=0.5 Y, it was found that there were no changes in the temperature-reduction effects at both the positive and negative rectifying elements 502 and 504. Under another condition of W=0.75 Y, it was found that the positive rectifying element 502 gained an improvement of −1 degree in the temperature-reduction effects and the negative rectifying element 504 gained an improvement of −3 degrees in the temperature-reduction effects. Further, under another condition of W=Y, it was found that the positive rectifying element 502 gained an improvement of −2 degrees in the temperature-reduction effects and the negative rectifying element 504 gained a greater improvement of −20 degrees in the temperature-reduction effects. In the case of another condition of W=1.3 Y, though the negative rectifying element 504 gained a noticeable improvement of −23 degrees in the temperature-reduction effects, the positive rectifying element 502 gained an amount of +3 degrees, showing that the temperature-reduction effects were reversed.

Considering the fact that the foregoing experimental results may be affected by various factors, the width W of each groove 804 can be set to an amount equal to or greater than some 1.5 times the outer diameter Y of each negative rectifying element 504. This setting will improve the temperature-reduction effects at each negative rectifying element 504. Alternatively, setting the width W of each groove 804 to an amount equal to or smaller than some 1.5 times the outer diameter Y of each negative rectifying element 504 will prevent the temperature-reduction effects at each positive rectifying element 502 from being lowered to a large extent.

Additionally, in view of the foregoing experimental results, it is preferred that the width W of each groove 804 is set to an amount falling in a range of 0.75 to 1.3 times the outer diameter Y of each negative rectifying element 504. It is particularly preferred that the width W is set to an amount falling in a range of 0.8 to 1.2 times the outer diameter Y of each negative rectifying element 504.

It is preferred that the axial height H of the radial air passage 810 is set to an amount equal to or larger than 0.5 times the thickness J of the larger-diameter fin 503 (H≧0.5 J). Particularly preferred is that the axial height H is set to an amount equal to or larger than the thickness J of the larger-diameter fin 503 (H≧J). Determining the axial height H on the above criteria allows cooling air to be taken in abundantly, providing improved temperature-reduction effects at the negative rectifying elements 504.

Further, the larger-diameter fin 503 is fixedly mounted to the frame 3b with no insert therebetween, so that heat can be transferred from the larger-diameter fin 503 to the frame 3b at a higher efficiency, whereby the larger-diameter fin 503 can be cooled down in an effective manner. On the other hand, concerning the smaller-diameter fin 501, its axial outward and inner ends are bent to stand up toward the protective cover 8 so as to form ribs 510 and 511. This rib configuration has the capability of causing cooling air to be taken in through the axial openings 801 to concentrate in the element areas of the smaller-diameter fin 501, which are opposed to the rectifying elements 502. The speed of cooling air passing by the elements 502 can therefore be raised, thereby increasing heat transfer efficiency. In addition, the surface area of the smaller-diameter fin 501 can be increased as well, thus providing an upgraded cooling performance.

Besides the above, the smaller-diameter fin 501 also functions as a current plate to smoothen the flows of cooling air to be taken in, whereby fan noise can be lessened. Further, both the ribs 510 and 511 are bent to be more distant from the larger-diameter fin 503 of which potential is different from the fin 501. Accordingly, compared to the configuration with no such ribs, both the fins 501 and 503 have secondarily the advantage of avoiding foreign substances from being present therebetween or corrosion products from piling therebetween.

As to the larger-diameter fin 503, its radially inner end is bent to stand up toward the frame 3b so as to form a rib 512. This rib 512 is effective for smoothening the cooling air to be taken in through the radial opening 802 toward the larger-diameter fin 503, then toward the cooling fan 21. As a result, the speed of the cooling air passing by the elements 504 increases, providing an improved heat transfer efficiency. On top of it, the surface area of the larger-diameter fin 503 can also be maintained at a greater quantity, providing a more efficient cooling performance. Like the smaller-diameter fin 501, the rib 512 also functions as a current plate, together with the remaining parts of the larger-diameter fin 503, to smoothen the flows of cooling air to be taken in, whereby fan noise can be diminished. Further, the rib 512 is bent to be more distant from the smaller-diameter fin 501 of which potential is different from the fin 503. Accordingly, compared to the configuration with no such a rib, both the fins 501 and 503 have secondarily the advantage of avoiding foreign substances from being present therebetween or corrosion products from piling therebetween.

Figure 6:
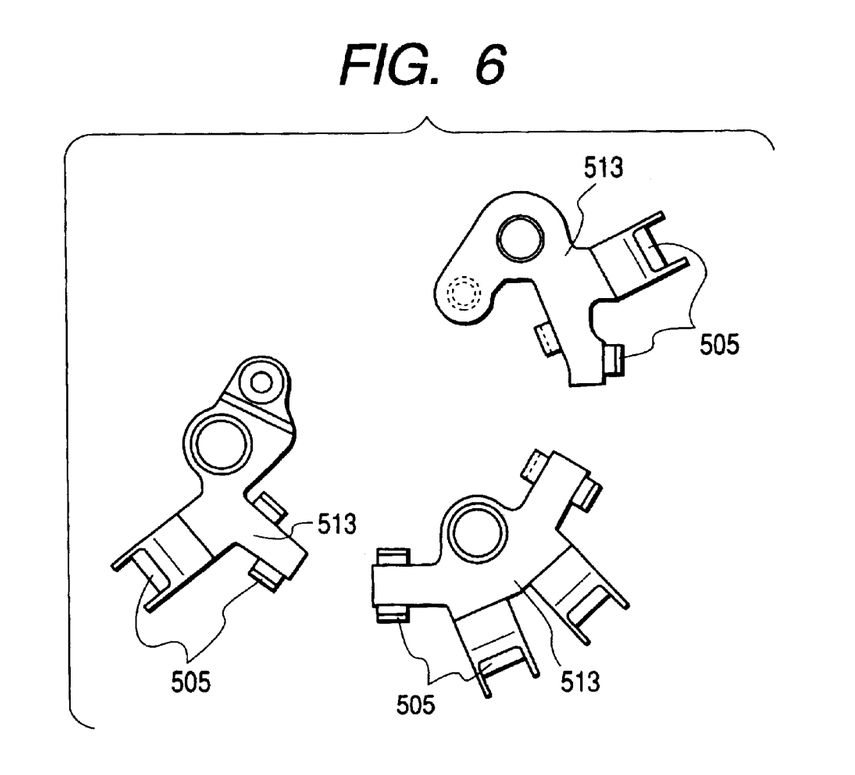
FIG. 6 shows the arrangement of terminal bases secured to the automotive AC generator.

Between the smaller-diameter and larger-diameter fins 501 and 503, three terminal bases 513 are placed, as shown in FIGS. 1 and 6. The terminal bases 513 are secured at three positions of supporters 301 that supports the bearing box 3*d* and extends radially, respectively (refer to FIG. 4). Both of the smaller- and larger-diameter fins 501 and 503 are secured, together with the terminal bases 513, to the supporters 301 and are exposed between the terminal bases 513. In addition, a shortest cooling air passage routing to a cooling air inlet 803 opened to the frame 3*b* can be secured via the clearance between the smaller-diameter and larger-diameter fins 501 and 503. It is therefore possible that the cooling air is allowed to flow toward the cooling fan 21 without any disturbances. The speed of the cooling air can be raised in the vicinity of elements, improving heat transfer efficiency. Moreover, an effective cooling fin area can be kept, which will lead to cooling the rectifying elements in a more excellent manner.

Furthermore, the flows of cooling air to be taken in can be smoothened, which will cause less noise.

Figure 3:
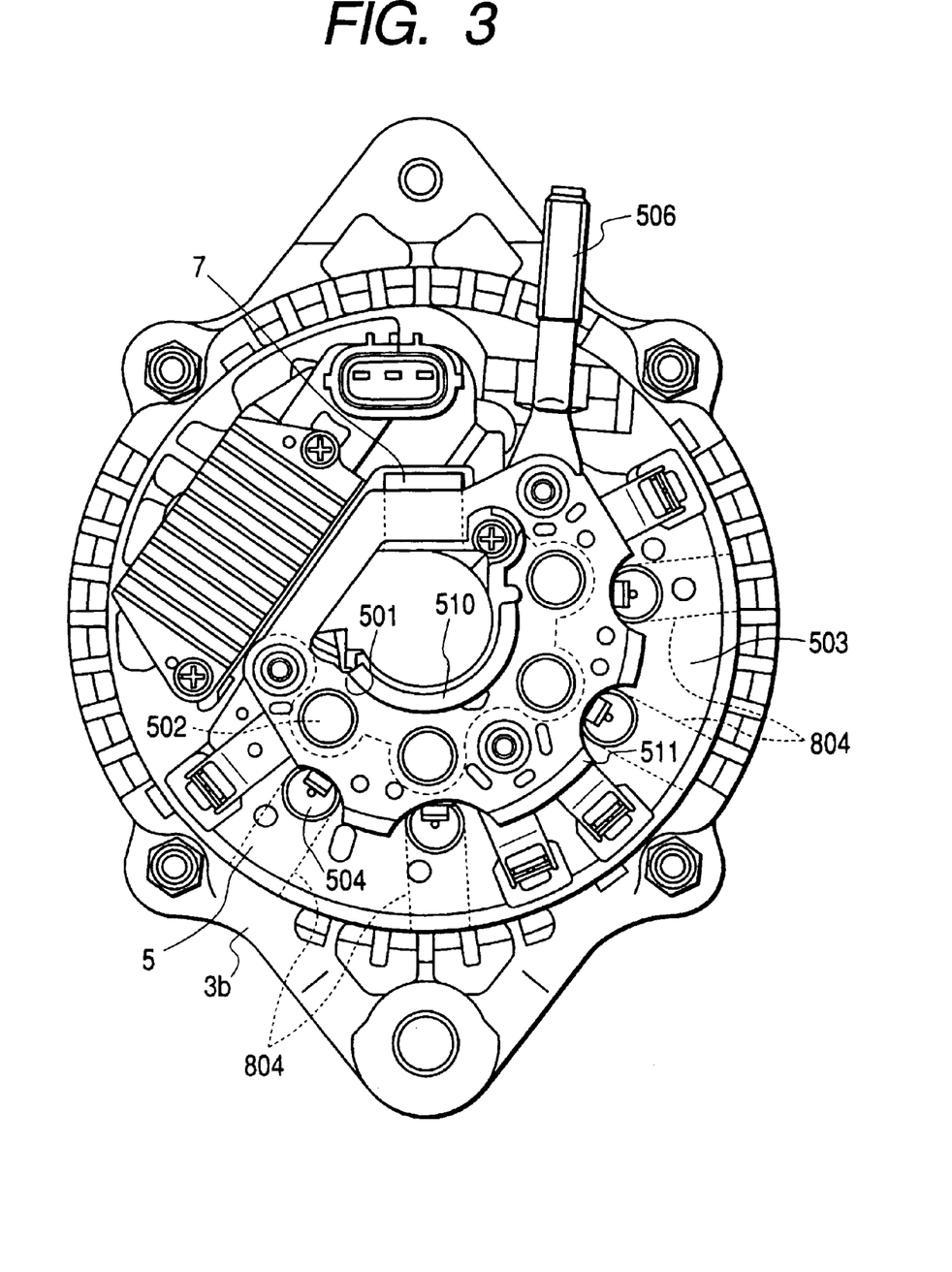
FIG. 3 is a frontal view showing the automotive AC generator shown in FIG. 1, with its protective cover disassembled.
Figure 4:
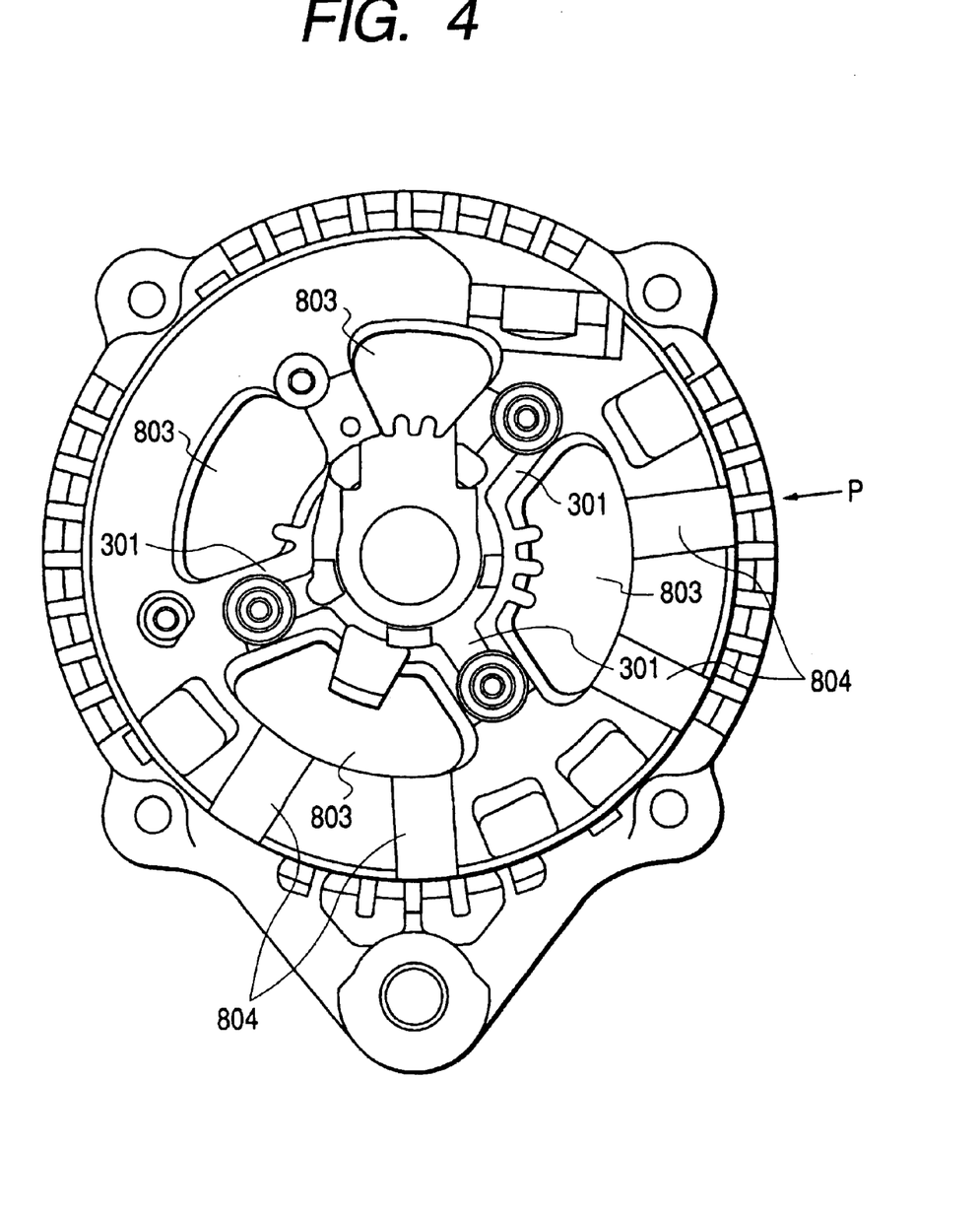
FIG. 4 is a frontal view showing the automotive AC generator shown in FIG. 1, with its protective cover and rectifier both disassembled.

Incidentally, in the embodiment, due to the fact that the two fins 501 and 503 relatively differ in their dimensions from each other, one fin 501 is called smaller-diameter fin, while the other fin 503 is called larger-diameter fin. In order to mount a plurality of rectifying elements on each of the fins 501 and 503, it is significantly required that each fin is formed to have a predetermined dimension in the radial direction. In the present embodiment, the smaller-diameter fin 501 is formed into a fin of which diameter is smaller, in which as shown in FIG. 3, a plurality of positive rectifying elements 502 are mounted along a circle of which diameter is smaller. On the other hand, the larger-diameter fin 503 is formed into a fin of which diameter is larger, in which as shown in FIG. 3, a plurality of negative rectifying elements 504 are mounted along a circle of which diameter is larger.

In addition, the smaller-diameter fin 501 has the radially inner end that is smaller in the dimension in the radial direction than that of the larger-diameter fin 503. The smaller-diameter fin 501 also has the radially outer end that is smaller in the radial direction than that of the larger-diameter fin 503. Further, the smaller-diameter fin 501 is disposed to position nearer to the axis of an automotive AC generator, while the larger-diameter fin 503 is disposed to position more distant from the axis thereof.

In this way, it is required that the two fins 501 and 503 be differentiated in diameters, because the positive rectifying elements 502 should be mounted at radial positions shifted from the negative rectifying elements 504. Additionally, the radially inner and outer ends of these fins 501 and 503 may be partially expanded or contacted depending on various conditions, such as levels requested for heat liberation performance. For instance, the radically outer end of the smaller-diameter fin 501 may be partially extended beyond that of the larger-diameter fin 503 in the radial direction.

Figure 9:
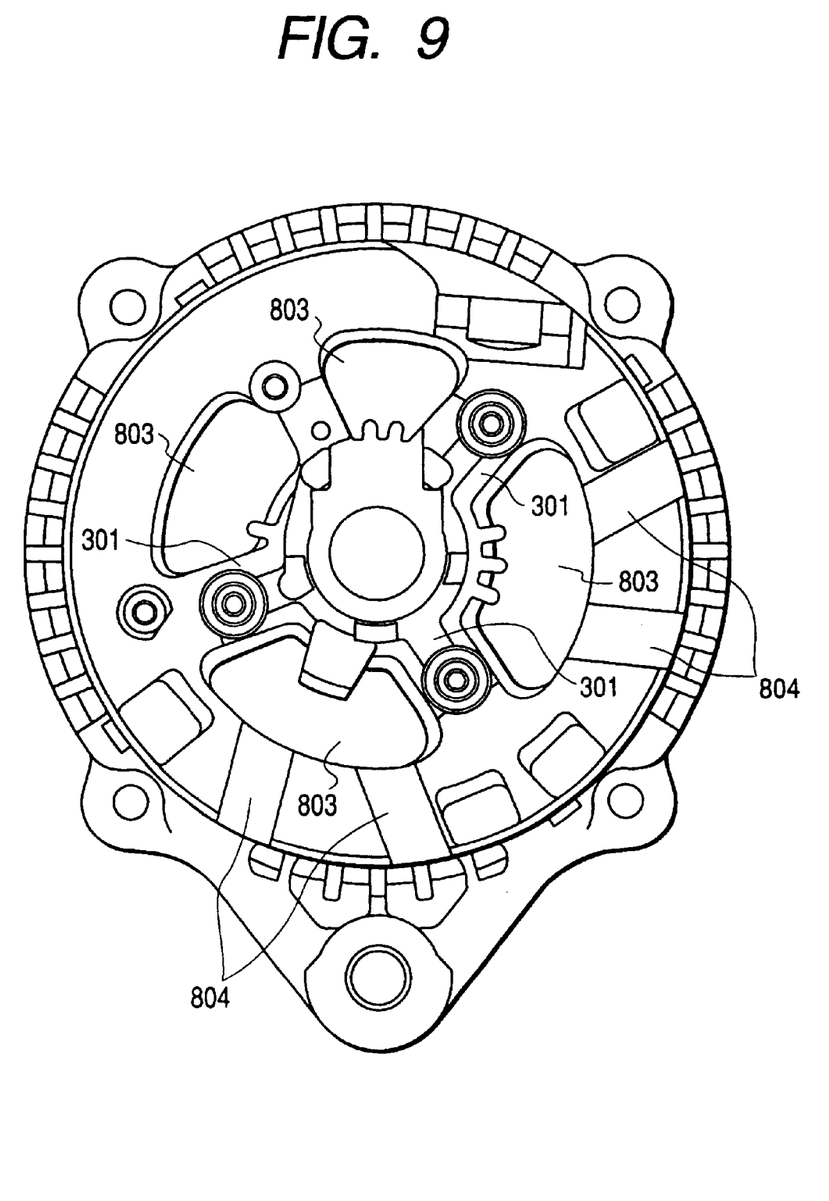
FIG. 9 is a frontal view showing an automotive AC generator according to a modification of the present invention, with its protective cover and rectifier both disassembled.

A modification of the foregoing embodiment can be provided as follows. In the foregoing embodiment, each groove 804 has been formed on the frame 3*b* so as to face the back of the mounted position of each negative rectifying element 504 and has run straight in the radial direction passing the center of the generator from the radially outer end of the frame 3*b* to the radially inner end thereof. The grooves 804 are not limited to the above configuration, but may be modified as shown in FIG. 9, in which each groove 804 is formed obliquely to the radial direction of the generator. In short, it is sufficient that each groove 804 faces a predetermined area on the rear surface of the larger-diameter fin 503, which corresponds to the mounted position of each negative rectifying element 504, and mutually connects the radially outer end of the frame 3*b* and the radially inner end thereof (that is, the end opened to the cooling air inlet 803).

Figure 5:
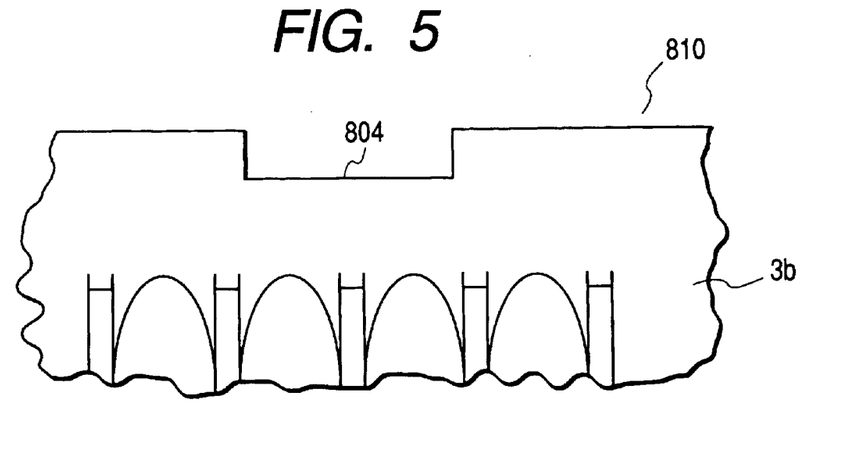
FIG. 5 is an enlarged view showing an essential part of the generator along an arrow P shown in FIG. 4.

Further, in the foregoing embodiment, each groove may be formed into various sectional shapes such as a U-shape, not always limited to the rectangle as shown in FIG. 5.

Still further, although the soldering has been used to mount the rectifying elements to the fins 501 and 503 in the foregoing embodiment, press-fitting may be used for such mounting work.

The present invention is not necessarily restricted to the constructions shown in the foregoing embodiment and its modifications, but a person having ordinary skill in the art can create a variety of constructions adequately altered or deformed within the scope of the following claims.

What is claimed is:

1. A vehicle AC generator comprising:
 a frame, having a radial direction and an axial direction, formed to have an inner wall area, a radially inner end, and a radially outer end in the radial direction and an outer end portion in the axial direction;
 a stator secured on the inner wall area of the frame;
 a rotor rotatably supported at the frame;
 a rectifier including a plurality of rectifying elements and being secured on the outer end portion of the frame, said plurality of rectifying elements being classified into a first group of rectifying elements and a second group of rectifying elements;
 a protective cover having an inner end portion and being secured on the outer end portion of the frame to cover the rectifier; and
 a cooling fan secured at the rotor and configured to take in cooling air from one side on which the rectifier is located, wherein
 the rectifier comprises
  a larger-diameter fin disposed to extend in the radial direction with facing the outer end portion of the frame, said larger-diameter fin serving as both of a cooling member for the first group of rectifying elements and a connecting conductive member of the first group of rectifying elements mounted on the larger-diameter fin; and
  a smaller-diameter fin disposed to face the inner end portion of the protective cover, said smaller-diameter fin serving as both of another cooling member for the second group of rectifying elements and another connecting conductive member of the second group of rectifying elements mounted on the larger-diameter fin,
 the protective cover comprises an axial opening facing the smaller-diameter fin and being formed through the frame to take cooling air in, and
 the frame comprises
  a radial opening formed with the aid of the radially outer end of the frame to take cooling air in,
  a radial air passage formed with facing the larger-diameter fin and formed to circulate the cooling air taken in through the radial opening along the larger-diameter fin inwardly in the radial direction, and
  a plurality of grooves each positionally corresponding to a mounted position of each rectifying element on the larger-diameter fin and being formed on the radial air passage to connect the radially outer end and the radially inner end of the frame.

2. The vehicle AC generator according to claim 1, wherein each groove on the radial air passage has a height in the axial direction, said height being set to an amount equal to or larger than about 0.5 times of a thickness of the larger-diameter fin.

3. The vehicle AC generator according to claim 1, wherein each groove has a width set to an amount equal to or larger than about 0.5 times a width of each rectifying element mounted on the larger-diameter fin.

4. The vehicle AC generator according to claim 3, wherein each groove on the radial air passage has a height in the axial direction, said height being set to an amount equal to or larger than about 0.5 times of a thickness of the larger-diameter fin.

5. The vehicle AC generator according to claim 3, wherein each groove has a width set to an amount equal to or smaller than about 1.5 times a width of each rectifying element mounted on the larger-diameter fin.

6. The vehicle AC generator according to claim 5, wherein each groove on the radial air passage has a height in the axial direction, said height being set to an amount equal to or larger than about 0.5 times of a thickness of the larger-diameter fin.

* * * * *